(12) United States Patent
Nazari et al.

(10) Patent No.: US 9,513,822 B2
(45) Date of Patent: Dec. 6, 2016

(54) UNMAP STORAGE SPACE

(71) Applicant: Hewlett Packard Enterprise Development LP, Houston, TX (US)

(72) Inventors: Siamak Nazari, Mountain View, CA (US); Daniel Aaron Harbaugh, Newcastle, WA (US); Gilad Sade, Newton, MA (US); Faris Hindi, Belmont, CA (US); Danyaal Masood Khan, San Carlos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 97 days.

(21) Appl. No.: 14/498,998

(22) Filed: Sep. 26, 2014

(65) Prior Publication Data

US 2016/0092121 A1    Mar. 31, 2016

(51) Int. Cl.
*G06F 12/02* (2006.01)
*G06F 3/06* (2006.01)

(52) U.S. Cl.
CPC .......... *G06F 3/0616* (2013.01); *G06F 3/0631* (2013.01); *G06F 3/0644* (2013.01); *G06F 3/0658* (2013.01); *G06F 3/0679* (2013.01); *G06F 12/0246* (2013.01); *G06F 2212/1036* (2013.01); *G06F 2212/152* (2013.01); *G06F 2212/214* (2013.01); *G06F 2212/253* (2013.01); *G06F 2212/7201* (2013.01); *G06F 2212/7204* (2013.01); *G06F 2212/7211* (2013.01)

(58) Field of Classification Search
CPC ..... G06F 12/0246; G06F 2212/72–2212/7211
See application file for complete search history.

(56) References Cited

U.S. PATENT DOCUMENTS 7,734,888 B1 * 6/2010 Hamilton .............. G06F 3/0605
                                                  711/114
8,650,461 B2    2/2014 Shalvi et al.
(Continued)

OTHER PUBLICATIONS

ISR/WO, PCT/US2015/014087, HP reference 84031118, May 26, 2015, 10 pps.
(Continued)

*Primary Examiner* — Nicholas Simonetti
(74) *Attorney, Agent, or Firm* — International IP Law Group, PLLC

(57) ABSTRACT

A system that includes a storage drive and a controller communicatively coupled to the storage drive. The storage drive includes a first region of storage space that is mapped to a virtual volume and at least a second region of storage space reserved for over-provisioning operations. The controller is to unmap an operable portion of the first region of storage space in response to aging of the storage drive so that the unmapped portion can be used for over-provisioning operations.

16 Claims, 4 Drawing Sheets

300

(56) References Cited

U.S. PATENT DOCUMENTS

| | | | |
|---|---|---|---|
| 2007/0260811 A1* | 11/2007 | Merry, Jr. | G06F 12/0246 711/103 |
| 2008/0082726 A1* | 4/2008 | Elhamias | G06F 12/0246 711/103 |
| 2012/0059978 A1 | 3/2012 | Rosenband et al. | |
| 2012/0284587 A1 | 11/2012 | Yu et al. | |
| 2013/0138870 A1 | 5/2013 | Yoon et al. | |
| 2013/0232289 A1* | 9/2013 | Zhong | G06F 12/0246 711/102 |
| 2013/0268824 A1* | 10/2013 | Shalvi | G06F 11/10 714/763 |
| 2013/0275672 A1 | 10/2013 | Bert | |
| 2014/0047170 A1 | 2/2014 | Cohen | |
| 2014/0074782 A1 | 3/2014 | Green et al. | |
| 2014/0101379 A1 | 4/2014 | Tomlin | |
| 2014/0195725 A1 | 7/2014 | Bennett | |
| 2015/0178191 A1* | 6/2015 | Camp | G06F 12/0246 711/103 |

OTHER PUBLICATIONS

Hu, Xiao-Yu et al., "Write Amplification Analysis in Flash-Based Solid State Drives," Retrieved from http://www.vmcd.org/scripts/gc_2.pdf, SYSTOR, May 7, 2009, 9 pps., Haifa, Israel.

Arthur Unknown, "OCZ RevoDrive 3 120GB PCIe Solid State Drive," Retrieved from http://www.cdrlabs.com/Reviews/ocz-revodrive-3-120gb-pcie-solid-state-drive/Garbage-Collect, Apr. 10, 2012, 4 pps.

* cited by examiner

200

212

218

222

400

UNMAP STORAGE SPACE

BACKGROUND

Solid State Drives (SSDs) are non-volatile data storage devices that are used for persistent data storage, but unlike hard disks drives, contain no moving parts. Some SSD drives use flash memory, which can retain data without being powered. One drawback of flash memory is that each memory cell of a flash-based SSD can be written only a limited number of times before the memory cell fails. To extend the life of flash-based SSDs, various techniques are employed to extend the life of drive, such as wear leveling, which spreads write operations more evenly across the memory cells of the drive.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
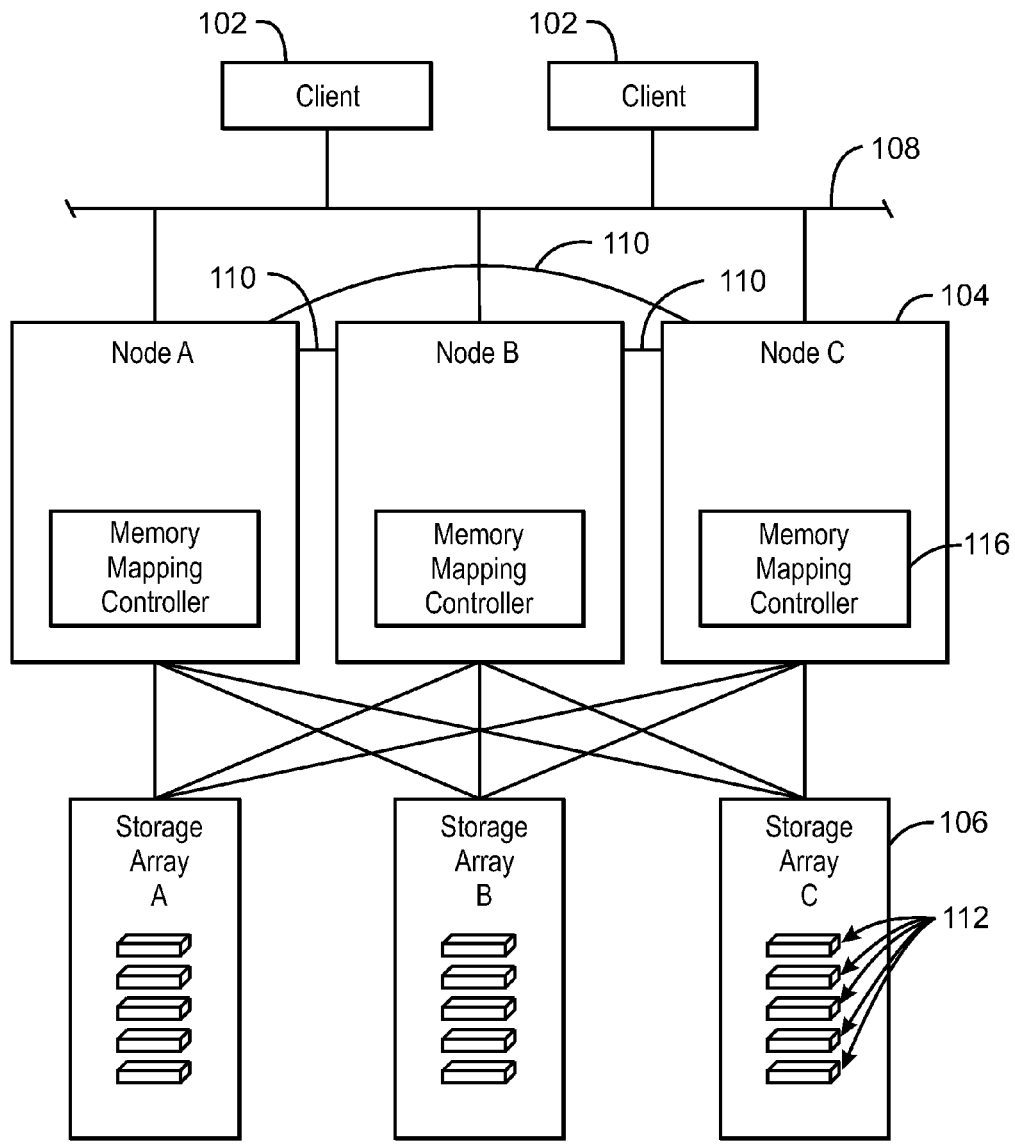
FIG. 1 is a block diagram of a storage system with storage drives that can be configured to unmap user storage space to make it available for over-provisioning.

One characteristic of flash memory is that flash memory cells cannot be directly overwritten. Thus, when data is written to an SSD memory cell, the cell must first be erased and then written. In some cases, this may result in two writes for each actual bit of data to be stored to the device. In most flash memory, data is written in units called pages, but data is erased in larger units called blocks. If enough data within a block is unneeded (i.e., stale pages), the entire block is erased and any good data in the block is re-written to a new block. The remainder of the new block that is left over can be written with new data. This process of erasing blocks and moving good data to new blocks is referred to as "garbage collection." Most SSDs include some amount of storage space that is reserved for garbage collection, wear-leveling, and remapping bad blocks, among other things. The difference between the physical amount of storage capacity and the logical capacity presented to the user is referred to as over-provisioning.

Techniques such as wear-leveling and garbage collection effect the drive's write amplification, which is a phenomenon in which the actual amount of physical information written within the drive is a multiple of the logical amount of data intended to be written. The higher the write amplification of a drive, the more writes that the cells of the drive will experience for a given amount of data storage usage. The greater the amount of storage space available for over-provisioning, the more efficient the wear-leveling and garbage collection algorithms can be, which can reduce write amplification.

Over time, some storage cells will begin to wear out and become unreliable. Unreliable storage cells can be remapped to a portion of the over-provisioning space. Remapping unreliable storage elements avoids loss of data, but also reduced the amount of storage space available for over-provisioning. As the over-provisioning space is reduced, the wear-leveling and garbage collection algorithms become less efficient, resulting in higher write amplification and greater wear on the remaining storage cells. Accordingly, if a substantial number of unreliable storage elements have been remapped to the over-provisioning space, the wear on the storage cells will begin to accelerate, reducing the useful life of the storage device.

The present disclosure provides techniques for extending the useful life of a storage drive such as a flash drive by dynamically increasing the amount of storage space on the drive available for over-provisioning. As unreliable storage cells are remapped to over-provisioning space, the over-provisioning space will tend to be reduced. To maintain a suitable amount of over-provisioning space, some storage space that was previously allocated as user space can be unmapped and used as additional over-provisioning space. By pro-actively unmapping user space, and thus making it available to the drive as an analogue of over-provisioning space, write-amplification and wear leveling impacts of drive aging can be mitigated. This will results in a corresponding decrease in the acceleration of drive aging and loss of write performance.

FIG. 1 is a block diagram of a storage system with storage drives that can be configured to unmap user storage space to make it available for over-provisioning. It will be appreciated that the storage system 100 shown in FIG. 1 is only one example of a storage system in accordance with embodiments. In an actual implementation, the storage system 100 may include various additional storage devices and networks, which may be interconnected in any suitable fashion, depending on the design considerations of a particular implementation. For example, a large storage system will often have many more client computers and storage devices than shown in this illustration.

The storage system 100 provides data storage resources to any number of client computers 102, which may be general purpose computers, workstations, mobile computing devices, and the like. The storage system 100 includes storage controllers, referred to herein as nodes 104. The storage system 100 also includes storage arrays 106, which are controlled by the nodes 104. The client computers 102 can be coupled to the storage system 100 directly or through a network 108, which may be a local area network (LAN), wide area network (WAN), a storage area network (SAN), or other suitable type of network.

The client computers 102 can access the storage space of the storage arrays 106 by sending Input/Output (I/O) requests, including write requests and read requests, to the nodes 104. The nodes 104 process the I/O requests so that user data is written to or read from the appropriate storage locations in the storage arrays 106. As used herein, the term "user data" refers to data that a person might use in the course of business, performing a job function, or for personal use, such as business data and reports, Web pages, user files, image files, video files, audio files, software applications, or any other similar type of data that that a user may wish to save to long term storage. Each of the nodes 104 can be communicatively coupled to each of the storage arrays 106. Each node 104 can also be communicatively coupled to each other node by an inter-node communication network 110.

The storage arrays 106 may include various types of persistent storage, including solid state drives 112, which may be referred to herein simply as drives or storage drives 112. In some examples, the drives 112 are flash drives. However, the drives 112 may also use other types of persistent memory, including resistive memory, for example. Each storage array 106 includes multiple drives 112. The storage network system 100 may also include additional storage devices in addition to what is shown in FIG. 1.

Each node 104 can also include a memory mapping controller 116 that controls the allocation of storage space in each drive 112 of the storage arrays 106. The memory mapping controller 116 can be implemented in hardware or a combination of hardware and programming code. For example, the memory mapping controller 116 can include a non-transitory, computer-readable medium for storing instructions, one or more processors for executing the instructions, or a combination thereof. In some examples, the memory mapping controller 116 is implemented as computer-readable instructions stored on an integrated circuit such as an Application Specific Integrated Circuit (ASIC), a Field Programmable Gate Array (FPGA), or other type of processor.

Each node 104 controls the memory allocation for a certain sub-set of the drives 112. In some examples, the storage system 100 can be configured so that each node 104 may control all the drives 112 of a specific storage array 106. For example, node A can be configured to control the drives 112 in storage array A, node B can be configured to control the drives 112 in storage array B, and node C can be configured to control the drives 112 in storage array C. Other arrangements are also possible depending on the design considerations of a particular implementation. Additionally, certain details of the storage system configuration can be specified by an administrator, including which nodes 104 control which drives 112, for example.

The memory mapping controller 116 can map some portion of the available storage space of a drive 112 as a user data region. The user data region represents storage space that exposed to the file system and is visible to a client computer. A user of the client computer 102 can store data to and receive data from the user data region. Each drive 112 includes storage space that is exposed to the nodes 104 and available for mapping as a user data region. Each drive also includes storage space, referred to herein as native over-provisioning space, which is reserved for over-provisioning and not exposed to the nodes 104. As a drive 112 ages, a larger amount of the over-provisioning space will be used up by remapping of unreliable storage segments, which will leave less storage space for wear-leveling and garbage collection. The memory mapping controller 116 can un-map some portion of the storage space previously allocated as a user space, based on the amount of over-provisioning space used for remapping unreliable storage segments. Unmapping a portion of allocated user space enables the drive 112 to use the free memory for additional over-provisioning operations.

Figure 2A:
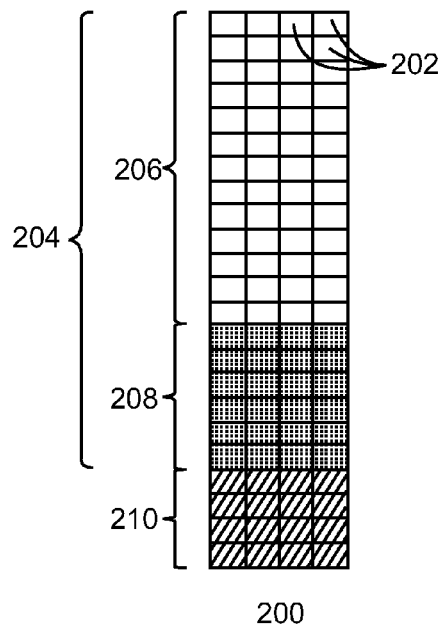
FIG. 2A is a block diagram showing an example memory allocation for a storage drive.

FIG. 2A is a block diagram showing an example memory allocation for a storage drive. Memory map 200 shows a memory allocation for a new drive, such as one of the drives 112 shown in FIG. 1. The storage space includes a plurality of memory segments, which for purposes of the present description are referred to herein as memory blocks 202. It will be appreciated that the techniques described herein can be used in relation to other types of memory segments, such as individual memory cells, memory pages, or any other suitable grouping of memory cells.

As shown in FIG. 2A, some portion of the storage space is mapped as a user data region 204. For example, the user data region can be mapped to one or more virtual volumes that are accessible to client computers 102. The user data region includes used storage space 206 and unused storage space 208. The used storage space 206 is storage space that is currently storing data. The unused storage space 208 is storage space that has been allocated as part of the user data region 204, but which isn't currently being used to store data.

Some portion of the storage space is mapped as an internal over-provisioning region 210. The internal over-provisioning region 210 may be reserved by the drive itself for over-provisioning processes such as garbage collection, wear-leveling, bad block remapping, and the like. The over-provisioning processes may be performed by the drive itself. For example, a processor of the drive can run firmware programmed for the over-provisioning processes. In some examples, the over-provisioning region 210 is not visible to or accessible by an external device storage controller, such as the nodes 104 of FIG. 1. In this sense, the over-provisioning region 210 is hidden storage space. The size of the internal over-provisioning region 210 may be determined by the drive manufacturer. Additionally, the drive can configured to be able to receive an instruction to use normally visible storage space for over-provisioning. Thus, the storage space used for over-provisioning is not fixed by the manufacturer of the drive.

Although not shown in FIG. 2A, the drive could also include additional storage space, which may be mapped for various purposes, including spare storage space, or storage for internal use by the storage system, such as drive identification labels, storage system table of content identifiers, or diagnostic and test areas. Additionally, a typical storage device will have many more storage blocks than are shown in FIG. 2A. Furthermore, for the sake of simplicity, the various regions are shown as contiguous memory segments. However, it will be appreciated that the regions 206, 208, and 210 may occupy non-contiguous arrangements of storage blocks.

Figure 2B:
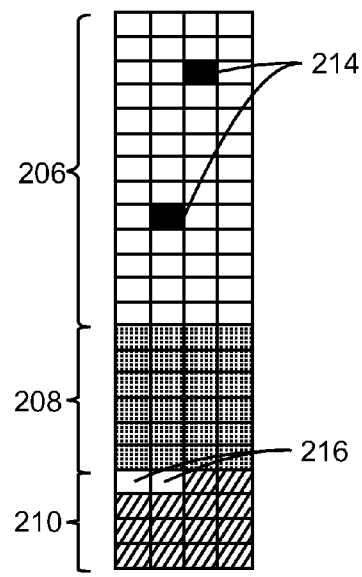
FIG. 2B is a block diagram showing an example memory allocation for the storage drive after some remapping of unreliable memory blocks to over-provisioning space.

FIG. 2B is a block diagram showing an example memory allocation for the drive after some remapping of unreliable memory blocks to over-provisioning space. The memory map 212 shown in FIG. 2B is the same as shown in FIG. 2A, with the exception that two of the storage blocks 202 within the used storage space 206 have been determined to be unreliable. The unreliable blocks are indicated by item number 214. A storage block may be identified as unreliable based on any suitable criteria, such as on the number of times the storage block has been written or based on detecting a write or read error associated the block 202.

The unreliable blocks 214 are remapped to blocks within the over-provisioning region 210. The remapped blocks are indicated by item number 216. The data originally stored at blocks 214 is moved to blocks 216, and the portion of the over-provisioning space 210 occupied by the blocks 216 is now part of the user data region 204 and is unavailable for over-provisioning operations.

The aging of the drive due to unreliable storage blocks may be characterized according to a parameter referred to herein as a wear indicator. The wear indicator may be any suitable parameter that indicates the level of aging due to unreliable storage blocks. For example, the wear indicator may be computed as a function of the number of unreliable blocks identified for the drive. In some examples, the wear indicator may be a life left percentage, which is the percentage of original over-provisioning space remaining in the native over-provisioning region 210. The life left percentage will decrease as more unreliable blocks are remapped to the native over-provisioning space 210. The wear indicator may be computed by the drive itself and stored to a log file on storage space of the drive. The memory mapping controller 116 residing on the node 104 has access to the log file and can read the wear indicator from the log at specified times or periodically. Depending on the value of the wear indicator, the memory mapping controller 116 can unmap a portion of drive storage space previously mapped to the user data region 204.

Figure 2C:
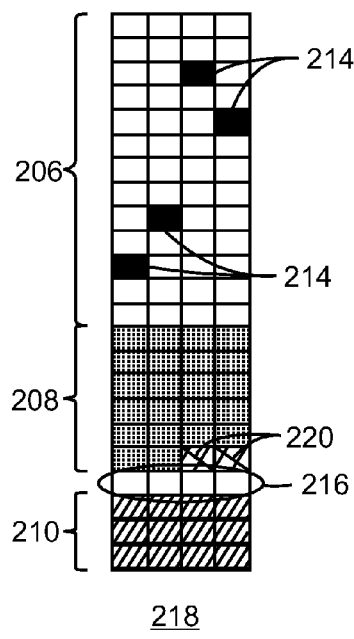
FIG. 2C is a block diagram showing an example memory allocation for the drive after additional remapping of unreliable memory blocks to over-provisioning space.

FIG. 2C is a block diagram showing an example memory allocation for the drive after additional remapping of unreliable memory blocks to over-provisioning space. As shown in the memory map 218 of FIG. 2C, the number of unreliable blocks 214 remapped to native over-provisioning space has doubled compared to the memory map 212 of FIG. 2B. The data originally stored at blocks 214 is moved to blocks 216. As a result, the over-provisioning region 216 has been reduced to three-quarters of the original storage space. At this stage, the memory mapping controller 116 has unmapped an operable portion of drive storage space previously mapped to the user data region 204. Specifically, the blocks 220, which were previously part of the unused storage space 208 have been unmapped. The unmapped blocks 220 are operable, meaning that they have not been identified as unreliable storage blocks and can still be used to reliably store data. The unmapped storage blocks 220 are now available for use in over-provisioning operations. In some examples, the memory mapping controller 116 informs the drive that the unmapped blocks 220 can be used for over-provisioning operations.

Figure 2D:
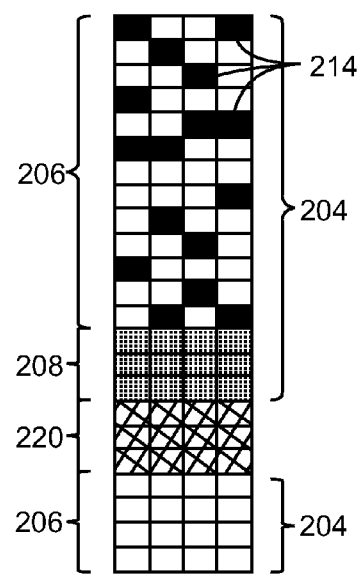
FIG. 2D is a block diagram showing an example memory allocation for the drive after the native over-provisioning space has been completely remapped for unreliable blocks.

FIG. 2D is a block diagram showing an example memory allocation for the drive after the native over-provisioning space has been completely remapped for unreliable blocks. As shown in the memory map 222 of FIG. 2D, the number of unreliable blocks 214 remapped to native over-provisioning space has completely used up the original native non-provisioning space. At this stage, the memory mapping controller 116 has unmapped a greater portion of the user data region 204 compared to the memory map 218 of FIG. 2C. Specifically, the blocks 220, which were previously part of the unused storage space 208 have been unmapped. The unmapped storage space 220 is now available for use in over-provisioning operations. Although the original allocation of over-provisioning space is remapped, the drive still has a significant amount of memory in which to perform over-provisioning operations. In this way, accelerated aging of the drive can be avoided. The additional over-provisioning space is acquired in exchange for a reduction in the apparent storage capacity of the drive. In other words, the available storage space that can be used by the nodes for storing user data is diminished in exchange for extending the life of the drive.

The unmapping of user storage space can be done in a graduated and capped manner. For example, various thresholds of drive aging can be specified such that, as each threshold is reached, a specified amount of the user data region 204 can be unmapped. The following table provides an example implementation for a 480 Gigabyte drive, wherein the drive aging is characterized as a life left percentage.

TABLE 1

Life left percentage and corresponding unmapped space.

| Life Left Percentage | Unmapped Space |
|---|---|
| 100 | 0 Gigabyte |
| 75 | 30 Gigabyte |
| 50 | 60 Gigabyte |
| 25 | 90 Gigabyte |
| 0 | 120 Gigabyte |

In Table 1, the life left percentage corresponds to a threshold percentage of the storage space still available in the native over-provisioning region for over-provisioning operations. The unmapped space corresponds to an amount of the original user date region that will be unmapped if the storage space still available in the native over-provisioning region for over-provisioning operations falls below the corresponding life left percentage. According to this example, if the life left percentage falls below 75 percent, the memory mapping controller 116 will unmap 30 Gigabytes of the user data region 204 to be used by the drive for over-provisioning operations. It will be appreciated that table 1 is only one example of many possible configurations.

Figure 3:
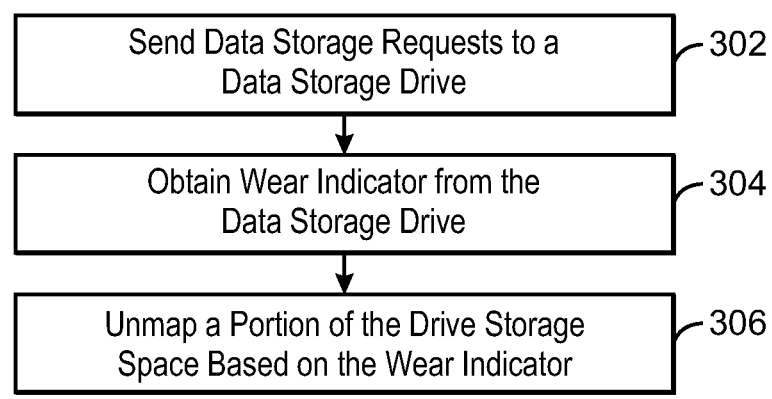
FIG. 3 is a process flow diagram summarizing a method of operating a storage drive.

FIG. 3 is a process flow diagram summarizing a method of operating a storage drive. The method 300 can be performed by a storage controller such as one of the nodes 104 shown in FIG. 1. The storage drive can be one of the drives 112 shown in FIG. 1. The storage drive includes a first region of storage space that is mapped to a virtual volume and at least a second region of storage space that is not mapped to the virtual volume and is used to perform over-provisioning operations.

At block 302, data storage requests are sent a storage drive. The data storage requests target the first region of storage space. The first region of storage space is also referred to in FIG. 2 as the user data region 204. During the processing the data storage requests the storage drive performs over-provisioning operations such as garbage collection, and wear leveling, among others. In some cases, the data storage request may result in an error and identification of an unreliable segment of data. The identification of an unreliable segment of data may result in the segment being mapped and the data being copied to a portion of the over-provisioning space.

Upon the identification of an unreliable segment of memory, the drive may update its wear indicator. In some examples, the wear indicator is computed by the storage drive as a function of the number of unreliable blocks identified for the drive. For example, the wear indicator may be a count of the number of unreliable blocks, or a percentage of unreliable blocks compared to the overall size of the user data region. In some examples, the wear indicator is computed by the storage drive as a percentage of the storage space still available in a second region of the drive for over-provisioning operations, referred to herein as a life left percentage.

At block 304, the controller obtains the wear indicator from the storage drive. The wear indicator can be obtained by reading the data from a memory location of the drive reserved for the wear indicator. In some examples, the wear indicator is obtained by reading the wear indicator from a log file stored to the drive. The wear indicator may be obtained from the drive periodically at specified intervals, according to a schedule, or in response to a user request.

At block 306, the controller unmaps a portion of the first region of storage space based on the wear indicator. The decision to unmap a portion of the first region of storage space can include comparing the wear indicator to a threshold wear level that is correlated with an amount of storage space to be unmapped, as described above in relation to Table 1, for example. The unmapped portion is no longer a part of the virtual volume and is not accessible to client computers. Thus, the unmapped portion can be used by the drive for over-provisioning operations. Unlike in the case of an unreliable memory block, the portion of memory that is unmapped at block 306 is still operable, meaning that it can be used to reliably store data.

Figure 4:
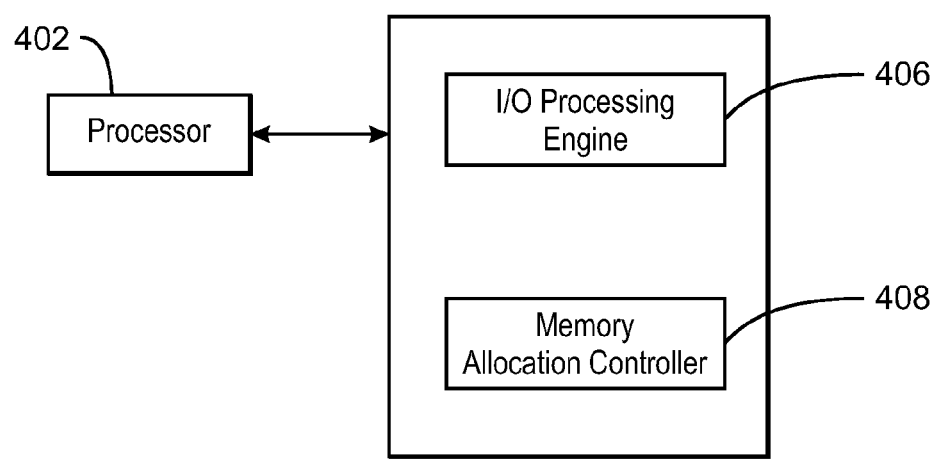
FIG. 4 is a block diagram showing a tangible, non-transitory, computer-readable medium that stores code configured to unmap user storage space of a storage drive.

FIG. 4 is a block diagram showing a tangible, non-transitory, computer-readable medium that stores code configured to unmap user storage space of a storage drive. The computer-readable medium is referred to by the reference number 400. The computer-readable medium 400 can include RAM, a hard disk drive, an array of hard disk drives, an optical drive, an array of optical drives, a non-volatile memory, a flash card or flash drive, a digital versatile disk (DVD), or a compact disk (CD), among others. The computer-readable medium 400 may be accessed by a processor 402, such as an ASIC. Furthermore, the computer-readable medium 400 may include code configured to perform the methods described herein. For example, the computer readable medium 400 may include firmware that is executed by a one or more of the nodes 104 of FIG. 1.

The various software components discussed herein may be stored on the computer-readable medium 400. A region 406 on the computer-readable medium 400 can include an I/O processing engine that processes I/O requests received from a client computer. For example, processing I/O requests can include storing data to a storage drive or retrieving data from a storage drive and sending it to a client computer that requested it. A region 408 can include a memory allocation controller configured to unmap an operable portion of the first region of storage space in response to aging of the storage drive so that the unmapped portion can be used for over-provisioning operations.

Although shown as contiguous blocks, the software components can be stored in any order or configuration. For example, if the tangible, non-transitory, computer-readable medium is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system comprising:
   a storage drive comprising a first region of storage space that is mapped to a virtual volume and at least a second region of storage space reserved for over-provisioning operations; and
   a controller communicatively coupled to the storage drive, the controller to:
   unmap an operable portion of the first region of storage space, corresponding to a life left percentage of original over-provisioning space that remains in the second region for over-provisioning operations, in response to the life left percentage falling below a threshold level; and
   reserve the unmapped portion for over-provisioning operations, such that the second region of storage space is increased in exchange for a reduction in an apparent storage capacity of the first region.

2. The system of claim 1, the life left percentage is characterized by a wear indicator computed by the storage drive.

3. The system of claim 2, wherein the controller obtains the wear indicator from the drive periodically and determines whether to unmap a portion of the first region of storage space based on the wear indicator.

4. The system of claim 2 wherein the threshold level is correlated with an amount of storage space to be unmapped.

5. The system of claim 1, wherein the storage drive is a solid state drive comprising flash memory.

6. The system of claim 1 wherein the unmapped portion corresponds to an amount of an original first region of storage space that will be unmapped if storage space still available in the second region of storage space used to perform over-provisioning operations falls below a corresponding life left percentage.

7. The system of claim 1 wherein the controller is to move data originally stored in the first region of storage space.

8. A method comprising:
   sending data storage requests to a drive, the storage requests targeting a first region of storage space of the drive that is mapped to a virtual volume, the drive to perform over-provisioning operations using at least a second region of storage space that is not mapped to the virtual volume;
   obtaining a wear indicator from the drive, wherein the wear indicator is computed by the storage drive as a percentage of original over-provisioning space remaining in the second region for over-provisioning operations; and
   unmapping an operable portion of the first region of storage space, in response to the wear indicator falling below a threshold level, such that the second region of storage space is increased in exchange for a reduction in an apparent storage capacity of the first region, wherein the wear indicator is to indicate original over-provisioning space that remains in the second region for over-provisioning operations.

9. The method of claim 8, wherein the wear indicator is computed by the storage drive as a function of the number of unreliable blocks identified for the drive.

10. The method of claim 8, wherein obtaining the wear indicator from the drive comprises periodically reading the wear indicator from a log file stored to the drive.

11. The method of claim 8, wherein the threshold level is correlated with an amount of storage space to be unmapped.

12. The method of claim 8 comprising:
   updating the wear indicator upon the identification of an unreliable segment in the second region of storage space used to perform over-provisioning operations.

13. A tangible, non-transitory, computer-readable medium comprising instructions that direct a processor to:
   send data storage requests to a drive comprising a first region of storage space that is mapped to a virtual volume and at least a second region of storage space used to perform over-provisioning operations and is not mapped to the virtual volume, wherein the storage requests target the first region of storage space;

obtain a wear indicator from the drive, wherein the wear indicator is computed by the storage drive as a percentage of original storage space still available in a second region of the drive for over-provisioning operations; and unmap an operable portion of the first region of storage space in response to the wear indicator falling below a threshold level, so that the unmapped portion is useable for over-provisioning operations.

14. The computer-readable medium of claim 13, wherein the wear indicator is computed by the storage drive as a function of the number of unreliable blocks identified for the drive.

15. The computer-readable medium of claim 13, wherein the instructions that direct the processor to obtain the wear indicator from the drive, direct the processor to periodically read the wear indicator from a log file stored to the drive.

16. The computer-readable medium of claim 13, wherein the computer-readable medium is included in a storage controller node of a storage area network.

* * * * *